(12) United States Patent
Stygar et al.

(10) Patent No.: US 7,679,297 B1
(45) Date of Patent: Mar. 16, 2010

(54) PETAWATT PULSED-POWER ACCELERATOR

(75) Inventors: William A. Stygar, Albuquerque, NM (US); Michael E. Cuneo, Albuquerque, NM (US); Daniel I. Headley, Albuquerque, NM (US); Harry C. Ives, Albuquerque, NM (US); Berry Cottrell Ives, legal representative, Albuquerque, NM (US); Ramon J. Leeper, Albuquerque, NM (US); Michael G. Mazarakis, Albuquerque, NM (US); Craig L. Olson, Albuquerque, NM (US); John L. Porter, Sandia Park, NM (US); Tim C. Wagoner, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 894 days.

(21) Appl. No.: 11/499,548

(22) Filed: Aug. 4, 2006

(51) Int. Cl.
*H05H 9/00* (2006.01)
(52) U.S. Cl. .................. 315/505; 315/501; 315/5.41
(58) Field of Classification Search .......... 315/5, 315/5.35, 5.41, 500, 501, 505–507
See application file for complete search history.

(56) References Cited

U.S. PATENT DOCUMENTS

| | | | | |
|---|---|---|---|---|
| 4,713,581 A | * | 12/1987 | Haimson | 315/5.41 |
| 4,730,166 A | * | 3/1988 | Birx et al. | 315/500 |
| 4,893,089 A | * | 1/1990 | Villa | 315/505 |
| 5,326,970 A | * | 7/1994 | Bayless | 250/269.1 |
| 6,278,239 B1 | * | 8/2001 | Caporaso et al. | 315/5.41 |

OTHER PUBLICATIONS

W. A. Stygar et al, "Theoretical z-pinch scaling relations for thermonuclear-fusion experiments", Physical Review E, vol. 72, 2005, pp. 026404-1-21.
Juan J. Ramirez, et al, "The Junpiter Program", Proc. 10$^{th}$ IEEE Int. Pulsed Power Conf. IEEE, Piscataway, NJ (1995) pp. 91-98.
K. W. Struve and D. H. McDaniel, "Wave-Form Optimization for a 60 MA Z-Pinch Driver" Proc. 12$^{th}$ Int. Conf. High-Power Particle Beams (Beams '98) IEEE, Haifa, Israel, 1998, pp. 334-337.

(Continued)

*Primary Examiner*—Douglas W Owens
*Assistant Examiner*—Jimmy T Vu
(74) *Attorney, Agent, or Firm*—Kevin W. Bieg (57) ABSTRACT

A petawatt pulsed-power accelerator can be driven by various types of electrical-pulse generators, including conventional Marx generators and linear-transformer drivers. The pulsed-power accelerator can be configured to drive an electrical load from one- or two-sides. Various types of loads can be driven; for example, the accelerator can be used to drive a high-current z-pinch load. When driven by slow-pulse generators (e.g., conventional Marx generators), the accelerator comprises an oil section comprising at least one pulse-generator level having a plurality of pulse generators; a water section comprising a pulse-forming circuit for each pulse generator and a level of monolithic triplate radial-transmission-line impedance transformers, that have variable impedance profiles, for each pulse-generator level; and a vacuum section comprising triplate magnetically insulated transmission lines that feed an electrical load. When driven by LTD generators or other fast-pulse generators, the need for the pulse-forming circuits in the water section can be eliminated.

21 Claims, 4 Drawing Sheets

OTHER PUBLICATIONS

P. Sincerny et al, "Concepts for an Affordable High Current Imploding Plasma Generator," Proc. 12$^{th}$ IEEE Int. Pulsed Power Conf. IEEE, Piscataway, NJ, pp. 479-483, 1999.

K. W. Struve et al, "ZX Pulsed-Power Design," Proc. 12$^{th}$ IEEE Int. Pulsed Power Conf. IEEE, Piscataway, NJ, (1999) pp. 493-496.

P. Corcoran et al, "Pulse Power for Future X-Ray Simulators," Proc. 13$^{th}$ IEEE Int. Pulsed Power Conf. IEEE, Piscataway, NJ, (2001) pp. 577-581.

M. G. Mazarakis et al, "Ultrafast LTD's for Bremsstrahlung Diodes and Z-Pinches," Proc. 13$^{th}$ IEEE Int. Pulsed Power Conf. IEEE, Piscataway, NJ, (2001) pp. 587-590.

Dillon H. McDaniel et al, "The ZR Refurbishment Project," Journal of Electrostatics, vol. 56 (2002) pp. 435-447.

S. T. Rogowski et al, "Operation and Performance of the First High Current LTD at Sandia National Laboratories", To be published in: Proc. 15$^{th}$ IEEE Int. Pulsed Power Conf. IEEE, Piscataway, NJ, (2005) Three pages.

Phil Spence et al, "Conceptual Design of Decade Half, a 15-MA, 300-ns PRS Driver" Proc. 5$^{th}$ Int. Conf. Dense Z Pinches AIP; Melville, NY (2002) pp. 43-46.

M. G. Mazarakis et al, "High Current Fast 100-NS LTD Driver Development in Sandia Laboratory", To be published in: Proc. 15$^{th}$ IEEE Int. Pulsed Power Conf. IEEE, Piscataway, NJ, (2005) Four Pages.

R. A. Petr et al, "Investigation of a radial transmission line transformer for high-gradient particle accelerators", Rev. Sci. Instrum., vol. 59, No. 1, Jan. 1988, pp. 132-136.

Karen Pendergraft et al, "An exact solution for a reflection coefficient in a medium having an exponential impedance profile", J. Accoust. Soc. Am., vol. 94, No. 1, Jul. 1993 pp. 580-582.

R. B. Spielman et al, "A Double Post-Hole Vacuum Convolute Diode for Z-Pinch Experiments on Saturn", Proc. 7$^{th}$ IEEE Int. Pulsed Power Conf. IEEE, Piscataway, NJ (1989), pp. 445-448.

T. D. Pointon et al, "Particle-in-cell simulations of electron flow in the post-hole convolute of the Z accelerator", Physics of Plasmas, vol. 8, No. 10, Oct. 2001, pp. 4534-4544.

W. A. Stygar et al, "Improved design of a high-voltage vacuum-insulator interface", The American Physical Society, Phys. Rev. ST Accel. Beams, vol. 8, (2005), pp. 050401-1-16.

W. A. Stygar et al, "Flashover of a vacuum-insulator interface: A statistical model", The American Physical Society, Phys. Rev. ST Accel. Beams, vol. 7, (2004), pp. 070401-1-21.

W. A. Stygar et al, "Water-dielectric-breakdown relation for the design of large-area multimegavolt pulsed-power systems", The American Physical Society, Phys. Rev. ST Accel. Beams, vol. 9, (2006), pp. 070401-1-9.

K. W. Struve et al, "Circuit-Code Modeling of the PBFA Z for Z-Pinch Experiments", Proc. 11$^{th}$ IEEE Int. Pulsed Power Conf. IEEE, Piscataway, NJ, (1997) pp. 162-167.

M. G. Mazarakis et al, "A Compact, High-Voltage E-Beam Pulser", Proc. 12$^{th}$ IEEE Int. Pulsed Power Conf. IEEE, Piscataway, NJ, (1999) pp. 412-415.

Landholt-Bornstein Handbook on Energy Technologies, Springer-Verlag, Berlin-Heidelberg (2005) pp. 495-528.

A. A. Kim et al, "High Power Direct Driver for Z-Pinch Loads", High Current Electronics Institute, Tomsk, Russia, Oral Session 4, pp. 263-267.

R. B. Spielman et al, "Pulsed Power Performance of PBFA Z", Proc. 11$^{th}$ IEEE Int. Pulsed Power Conf. IEEE; Piscataway, NJ (1997) pp. 709-714.

R. B. Spielman et al, "Tungsten wire-array Z-pinch experiments at 200 TW and 2 MJ", American Institute of Physics, Physics Plasmas, vol. 5, No. 5 May 1998, pp. 2105-2111.

R. B. Spielman et al, "Efficient x-ray production from ultrafast gas-puff Z pinches", Journal of Applied Physics, vol. 57, No. 3, Feb. 1985, pp. 830-833.

T. H. Martin, et al, "Proto-II—A Short Pulse Water Insulated Accelerator", Proc. Int. Tropical Conf. Electron Beam Research & Tech., Sandia Labs, Albuquerque, NM; p. 450 (1975).

* cited by examiner

PETAWATT PULSED-POWER ACCELERATOR

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to pulsed-power technology and, in particular, to a pulsed-power accelerator that can deliver about 10 TW to more than 1000 TW of electrical power to a load. The accelerator architecture can also be used to produce electrical powers of substantially less than 10 TW.

BACKGROUND OF THE INVENTION

A number of high-current pulsed-power accelerators have been developed by the international pulsed-power community. Many of these accelerators have been optimized to drive z-pinch loads. These z-pinch accelerators have been used for a wide variety of inertial confinement fusion (ICF), radiation physics, equation-of-state, plasma physics, astrophysics, and other high-energy-density-physics (HEDP) experiments.

Presently, the z-pinch driver that operates at the highest electrical power is the Z accelerator, which is located at Sandia National Laboratories. See R. B. Spielman et al., *Proc. 11$^{th}$ IEEE Int. Pulsed Power Conf.*, IEEE, Piscataway, N.J., p. 709 (1997). The Z accelerator delivers 55 terawatts (TW) of electrical power to the accelerator's vacuum-insulator stack, and 19 megamperes (MA) to a 10-mm-initial-radius 10-mm-length pinch that implodes in 95 nanoseconds (ns). Such a z-pinch radiates 130 TW of x-ray power in a 10-ns pulse. See R. B. Spielman et al., *Phys. Plasmas* 5, 2105 (1998).

Recent calculations suggest that accelerators with electrical powers in excess of 1000 TW (i.e., in excess of one petawatt) will be required to drive z-pinch implosions that radiate in excess of 1000 TW of x-ray power. Such radiated powers would enable large-diameter ICF-capsule implosion experiments and other HEDP experiments to be conducted over heretofore inaccessible parameter regimes. See W. A. Stygar et al., *Phys. Rev. E* 72, 026404 (2005).

A number of architectures have been proposed in the literature for the design of future pulsed-power z-pinch drivers. These architectures are described in the following references: C. L. Olson, "Inertial confinement fusion: z-pinch", Chapter 9, *Landholt-Boernstein Handbook on Energy Technologies*, editor-in-chief: W. Martienssen, volume VIII/3 of Fusion Technologies, edited by K. Heinloth, (Springer-Verlag, Berlin-Heidelberg, 2005); J. J. Ramirez, *Proc. 10$^{th}$ IEEE Int. Pulsed Power Conf.*, IEEE, Piscataway, N.J., p. 91 (1995); K. W. Struve and D. H. McDaniel, *Proc. 12$^{th}$ Int. Conf. High-Power Particle Beams (Beams '98)*, IEEE, Haifa, Israel, p. 334 (1998); P. Sincerny et al., *Proc. 12$^{th}$ IEEE Int. Pulsed Power Conf.*, IEEE, Piscataway, N.J., p. 479 (1999); K. W. Struve et al., *Proc. 12$^{th}$ IEEE Int. Pulsed Power Conf.*, IEEE, Piscataway, N.J., p. 493 (1999); P. Corcoran et al., *Proc. 13$^{th}$ IEEE Int. Pulsed Power Conf.*, IEEE, Piscataway, N.J., p. 577 (2001); M. G. Mazarakis et al., *Proc. 13$^{th}$ IEEE Int. Pulsed Power Conf.*, IEEE, Piscataway, N.J., p. 587 (2001); D. H. McDaniel et al., *Proc. 5$^{th}$ Int. Conf. Dense Z Pinches*, AIP, Melville, N.Y., p. 23 (2002); P. Spence et al., *Proc. 5$^{th}$ Int. Conf. Dense Z Pinches*, AIP, Melville, N.Y., p. 43 (2002); and M. G. Mazarakis et al., to be published in the *Proc. 15$^{th}$ IEEE Int. Pulsed Power Conf.*, IEEE, Piscataway, N.J. (2005).

These prior pulsed-power accelerator architectures are capable of being scaled to deliver electrical powers in excess of a petawatt. However, the new architecture described below is significantly more efficient, and hence is less expensive, than any of these prior architectures.

SUMMARY OF THE INVENTION

The present invention is directed to a pulsed-power accelerator, comprising the following cylindrically concentric sections: (i) An oil section comprising one or more stacked levels of pulse generators. Each pulse-generator level comprises a plurality of pulse generators. Each pulse generator can be, for example, a Marx generator, one or more capacitors, a linear-transformer driver (LTD), a linear inductive voltage adder (IVA), or a dielectric cavity adder. The pulse generators include the initial electrical-energy storage system of the accelerator and each pulse generator generates a forward-going power pulse. (ii) A water section comprising stacked monolithic triplate radial-transmission-line impedance transformers. There is one such radial-line transformer for each of the pulse-generator levels. The water section can further comprise an intermediate pulse-forming circuit, between each pulse generator and the associated radial-line transformer, to further increase, shorten, shape or otherwise form the forward-going power pulse. The pulse-forming circuit can comprise one or more intermediate-store capacitors or a Blumlein circuit, with associated output switches, for each pulse generator. For example, the intermediate stores can be pulse charged to a high voltage by a Marx generator. After the intermediate stores are pulse charged, each intermediate store is discharged through the one or more switches to produce an electrical output pulse. The switches can be, for example, gas switches that can be triggered either electrically or by a laser. Alternatively, the switches can be self-break, liquid- or solid-dielectric, or semiconductor switches. On each level, the forward-going power pulses generated by the pulse generators or formed by the intermediate pulse-forming circuits are combined at the input to the triplate radial line. The impedance at the input of the radial line preferably maximizes the transfer of electrical power from the pulse generators or the intermediate pulse-forming circuits to the radial line. The combined pulse propagates in the radial line toward the center of the accelerator in a radially converging manner. The impedance of the radial line increases as the radius decreases. An approximately exponential impedance profile maximizes the power and energy transport efficiency of the radial line. (iii) A vacuum section located at the center of the accelerator comprising stacked triplate vacuum-transmission lines. There is one such stacked triplate vacuum-transmission line for each water-insulated triplate radial-transmission-line impedance transformer for delivering the combined radially converging power pulse to an electrical load. The electrical output of each triplate radial-line transformer is connected to the input of one of the triplate vacuum-transmission lines. The impedance at the output of the radial line preferably maximizes the transfer of power from the output of the radial line to the triplate vacuum-transmission line. Each triplate vacuum-transmission line comprises two vacuum-insulators, which are electrically in parallel, and which form the water-vacuum interface, and two magnetically insulated transmission lines (MITLs) that are also electrically in parallel. The vacuum section can further comprise a post-hole vacuum convolute that adds the currents at the outputs of two or more stacked MITLs, and delivers the combined current to the electrical load. The electrical load can be a z-pinch or another electrical load located at the center of the accelerator. The pulsed-power accelerator can be single-sided, to drive the electrical load from one side, or two-sided, to drive the electrical load from two sides.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

The petawatt pulsed-power accelerator of the present invention can be driven by various types of electrical-pulse generators. Described herein are specific examples of accelerators driven by conventional slow Marx generators and by fast linear-transformer drivers. The accelerator can have an intermediate pulse-forming circuit between each pulse generator and the associated radial-line transformer to further form the forward-going power pulses generated by the pulse generators before they are combined in the radial line. The pulsed-power accelerator can be used to drive an electrical load from one- or two-sides. General descriptions of these different accelerator embodiments are provided below.

A specific example is provided below of a single-sided Marx-based pulsed-power accelerator that can produce a 100-ns, 500-TW electrical power pulse, which is an order of magnitude greater than the electrical power presently achieved on the Z accelerator. Another example provided below describes a single-sided Marx-based accelerator that can produce a 250-ns, 460-TW electrical power pulse. A third example describes a two-sided Marx-based accelerator that provides two parallel output transmission lines. Such a two-sided accelerator can be used to power two z pinches in a double-pinch-driven hohlraum for ICF capsule implosions, or to power any other load that requires a two-sided drive. The two-sided example described below can produce an approximately 100-ns, 680 TW power pulse. A fourth example provided below describes an LTD-based pulsed-power accelerator that has some advantages over an accelerator driven by Marx generators.

General Description of a Single-Sided Pulsed-Power Accelerator

Figure 1:
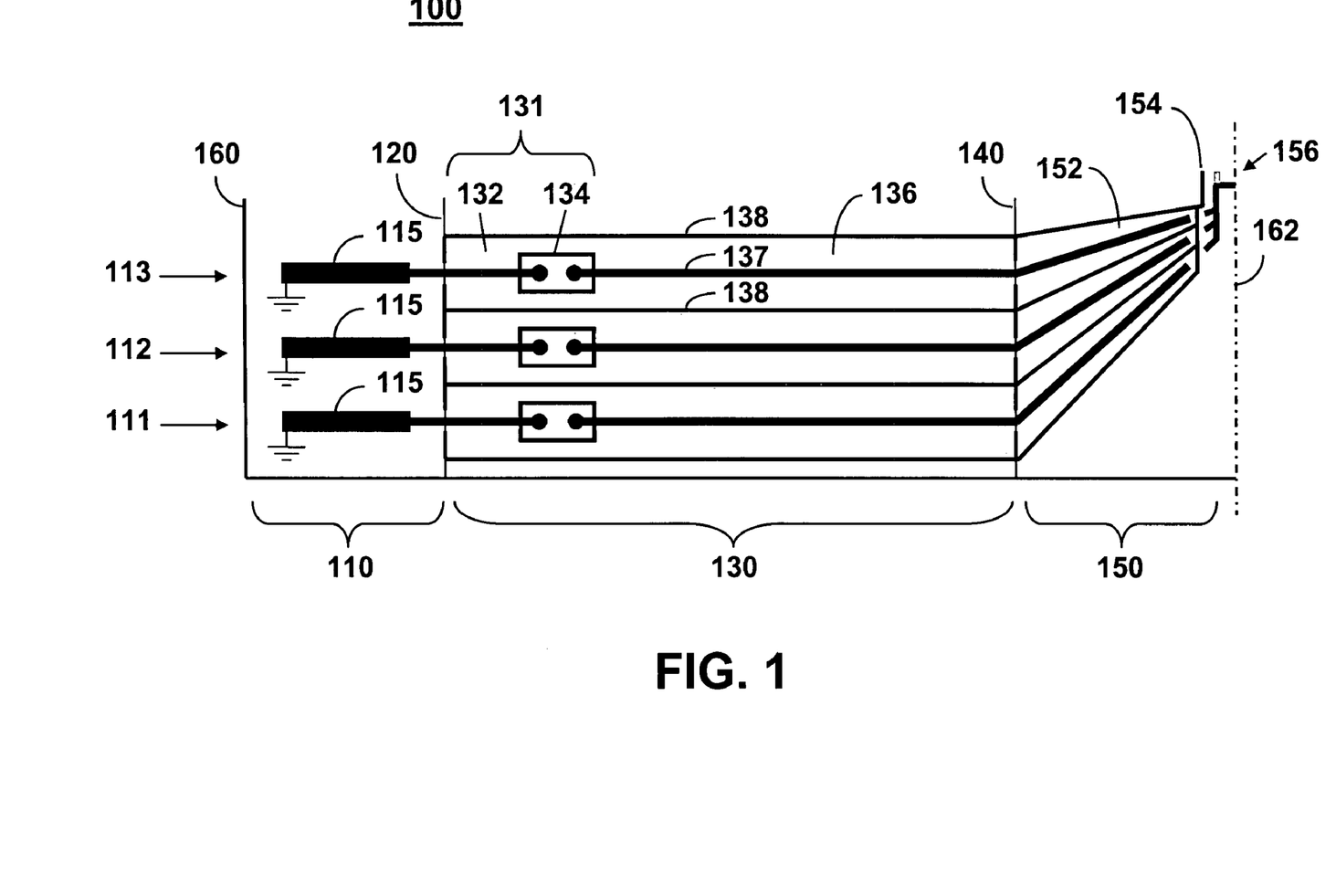
FIG. 1 shows a schematic illustration of a single-sided pulsed-power accelerator that can be used to drive a z-pinch load. This exemplary accelerator comprises 3 levels of pulse generators, 3 levels of intermediate-store capacitors and associated switches, 3 monolithic triplate radial-transmission-line impedance transformers, 3 triplate vacuum-transmission lines, a triple-post-hole vacuum convolute, and a single z-pinch load.

In FIG. 1 is shown a schematic illustration of an exemplary single-sided pulsed-power accelerator 100. Like that of many other z-pinch drivers, the pulsed-power accelerator 100 comprises an oil section 110, a water section 130, and a vacuum section 150. The water section 130 is located within the oil section 110, and the vacuum section 150 lies within the water section 130. The three sections 110, 130, and 150 preferably have cylindrical geometries, and can be concentric about a symmetry axis 162 within a cylindrical tank 160. An insulating oil-water interface 120 separates the oil section 110 from the water section 130. A vacuum-insulator stack 140 separates the water section 130 from the vacuum section 150.

The oil section 110 comprises at least one pulse-generator level 111 having a plurality of pulse generators 115. Additional levels 112 and 113 of pulse generators 115 can be stacked on the bottom level 111 to provide multiple stacked pulse-generator levels. The outer diameter of the oil section 110, and the number of pulse-generator levels, can be determined by the desired number of pulse generators 115, which depends on the desired amount of initial energy storage. The exemplary single-sided accelerator 100 shown in FIG. 1 comprises three pulse-generator levels 111, 112, and 113. The number of levels can be increased to increase the current delivered to the electrical load.

The pulse generators 115 are the initial electrical-energy-storage system of the accelerator 100. Typically, the pulse generator 115 can be a Marx generator, which comprises a plurality of capacitors that are slow-charged in parallel and discharged in series, thereby generating a high-voltage forward-going power pulse. For example, a Marx generator on the Z accelerator comprises many capacitors that are charged in parallel to about 90 kilovolts in about 90 seconds and discharged in series to provide an approximately 1 microsecond, 5 megavolt forward-going power pulse. Alternatively, the pulse generator 115 can be one or more capacitors, a pulse transformer, a linear IVA, a dielectric cavity adder, an LTD generator, or other type of generator capable of generating a high-voltage power pulse.

The water section 130 of the pulsed-power accelerator 100 comprises an intermediate pulse-forming circuit 131 for each pulse generator 115. The pulse-forming circuit 131 is pulse-charged by the pulse generator 115 and can increase, shorten, shape, or otherwise form the forward-going power pulse. The pulse-forming circuit 131 can comprise one or more water-dielectric intermediate-store capacitors 132 for each pulse generator 115 and one or more switches 134 for each intermediate store 132. The switches 134 can be, for example, gas switches that are triggered either electrically or by a laser. This type of pulse-forming circuit on the Z accelerator provides an approximately 200 ns forward-going output pulse. Other types of pulse-forming circuits, such as a Blumlein circuit, can also be used. The water section 130 further comprises one monolithic triplate radial-transmission-line impedance transformer 136 for each pulse-generator level 111, 112, or 113. The water section shown in FIG. 1 has 3 levels of triplate intermediate-store capacitors, a single switch per intermediate store, and 3 levels of monolithic triplate radial-transmission-line impedance transformers.

The variable-impedance triplate radial-transmission-line transformers of the present invention are similar to the biplate radial transformer of Petr et al. for generating a high-voltage pulse applicable to particle acceleration. See R. A. Petr et al., *Rev. Sci. Instrum* 59, 132 (1988), which is incorporated herein by reference. The inner conductor 137 of each triplate radial line 136 is a cathode. The outer conductors 138 of each triplate radial line 136 are anodes. The radial lines 136 use a water dielectric and have variable impedance profiles. Preferably, the impedance profile is approximately exponential, and can be chosen to optimize the power and energy transport efficiencies of the accelerator. The anode-cathode (AK) gaps of the triplate radial lines 136 are shown in FIG. 1 as being independent of radius. However, the actual gaps would vary with radius to provide the desired impedance profile.

In the examples described below, the variable-impedance radial-transmission-line transformers are assumed to have exponential impedance profiles; i.e, that $$\frac{1}{Z_r}\frac{dZ_r}{dr} = \text{constant}, \quad (1)$$

where $Z_r$ is the radially dependent impedance of the transformers and r is the radial coordinate. In such a transformer, the fractional change in the impedance per unit length is held constant. Exponential transformers are more efficient than those with a linear impedance profile (i.e., when $dZ_r/dr$=constant). However, the precise impedance profile that optimizes the performance of a radial-transmission-line transformer is apparently not known. See K. Pendergraft and R. Pieper, *J. Acoust. Soc. Am.* 94, 580 (1993).

The intermediate stores are pulse charged by the pulse generators, as the pulse generators erect. When the voltage across the intermediate stores is near its peak value, the switches can be triggered, launching electrical power pulses at the input to the monolithic radial lines. A radially converging power pulse subsequently propagates in the radial line transformers toward the vacuum section, which is located at the center of the accelerator. Therefore, the radial lines combine the outputs of the plurality of pulse generators to produce a single electrical pulse at the vacuum-insulator stack.

The vacuum section 150 comprises a level of triplate vacuum-transmission lines for each level 111, 112, or 113 of pulse generators 115. Each triplate vacuum-transmission line comprises two vacuum insulators, which are electrically in parallel, that form the water-vacuum interface, and two MITLs that are also electrically in parallel and form a triplate MITL 152. Depending on the number of vacuum-transmission line levels and the type of electrical load 156, the triplate MITLs 152 can feed a post-hole vacuum convolute 154 that in turn feeds the load 156. The convolute 154 adds the output current of each of the triplate MITLs, and delivers the combined current to the load 156. The pulsed-power accelerator 100 can be used with a variety of electrical loads. In particular, the accelerator 100 can be used as a high-current z-pinch driver.

The vacuum section in the example shown in FIG. 1 comprises a vacuum-insulator stack, 3 triplate MITLs, a triple-post-hole vacuum convolute, and a z-pinch load. The stack and MITLs have 3 levels, to match the 3 triplate radial-line levels in the water section, and the 3 pulse-generator levels in the oil section. The currents at the outputs of the MITLs are added by the triple-post-hole vacuum convolute; the combined current is delivered by the convolute to the z-pinch load. The triple-post-hole convolute is a straightforward extension of the double-post-hole convolute. See R. B. Spielman et al., *Proc. 7$^{th}$ IEEE Int. Pulsed Power Conf.*, IEEE, Piscataway, N.J., p. 445 (1989); and T. D. Pointon et al., *Phys. Plasmas* 8, 4534 (2001).

Advantages of Monolithic Radial-Transmission-Line Impedance Transformers

The large-diameter monolithic radial-transmission-line impedance transformers provide many advantages over prior architectures for high-current z-pinch accelerators. Some of these advantages are listed as follows:

(i) The radial-line transformers offer a straightforward, efficient, and relatively inexpensive method of combining the outputs of several-hundred terawatt-level electrical-pulse generators (e.g., Marx generators) to provide a petawatt-level combined electrical-power pulse. See Petr et al.

(ii) The flat triplate geometry of the radial-line transformer enables the use of more than one switch per intermediate-store capacitor. Increasing the number of switches in this manner reduces the total inductance and resistance of the switch system, which narrows the width of the forward-going power pulse. Consequently, there is less need for the inefficient self-break water switches that are used for pulse sharpening in prior accelerator architectures. Not only are such water switches inefficient, they also launch a pressure pulse in the water, which can damage nearby accelerator hardware.

(iii) The impedance at the input of each radial-line transformer can be chosen to maximize the electrical power that is transferred from the intermediate pulse-forming circuits to the radial-line transformer. The optimum input impedance is determined by the impedance of the intermediate-store capacitors, the inductance and resistance of the switches, the temporal width of the power pulse at the radial-line transformer input, and the shape of the power pulse.

(iv) The impedance at the output of the radial-line transformers can be chosen to maximize the power transferred from the radial-line transformers to the accelerator's stack-MITL vacuum-section system. The optimum output impedance is determined by the vacuum-section inductance, the functional dependence of the inductance on the stack voltage, the temporal width of the power pulse at the radial-line output, the shape of the power pulse, and the z-pinch implosion time.

(v) Since the radial lines are transformers, they increase the voltage generated by the switches to the voltage required to drive the vacuum stack-MITL system. See Petr et al. Consequently, the radial-line transformers eliminate the need for voltage-adding hardware, such as cross-over networks, transit-time-isolated transmission-line adders, and high-permeability ferromagnetic cores, which are assumed by prior petawatt-level accelerator architectures. The required voltage transformation is performed directly by the radial-line transformers, since the number of transformers is chosen to be identical to the number of MITLs.

(vi) Since the radial lines are transformers, and since their one-way transit time is much longer than the temporal width of power pulses of interest, the transformers also serve as passive high-pass filters. See Petr et al. Hence the radial lines sharpen the forward-going power pulse, in addition to the sharpening described in paragraph (ii) above. Such sharpening further reduces the need for self-break water switches assumed in prior accelerator designs.

(vii) The radial lines smooth azimuthal variations in the forward-going power pulses generated by the switches. Such variations are caused by statistical differences in the times at which the switches close, and also by differences in the peak voltages generated by the switches. The smoothing reduces the probability that such fluctuations would weaken magnetic insulation in the vacuum-transmission lines.

(viii) The radial lines make it possible to shape the load current, for applications that require a specific load-current waveform. Shaping can be achieved by phasing the times at which the pulse generators launch their forward-going pulses. The pulses can be smoothed azimuthally by the time they arrive at the vacuum-section MITLs.

(ix) The anodes of the radial lines can be effectively monolithic and relatively flat. Hence such transmission lines do not require significant geometric enhancements of the electric field at the anodes, where dielectric breakdown in the water is most likely to initiate. Of course, each of the radial-transmission-line anodes and cathodes are not actually monolithic in the strictness sense (i.e., each electrode would not be fabricated from a single sheet of metal). For example, due to fabrication issues, the radial lines would probably be divided into several sections. In addition, there would probably be several wide radial slots cut in both the anode and cathode electrodes for diver access and overhead-crane support. However, the anode can be closed during an accelerator shot.

(x) The relatively flat geometry of the anodes and cathodes makes them relatively inexpensive to fabricate.

(xi) The relatively closed geometry of the radial lines reduces considerably electromagnetic radiation losses, which improves accelerator efficiency.

(xii) The relatively closed geometry also shields experimental, diagnostic, and facility hardware from the electromagnetic pulse generated by the accelerator.

Analytic Marx-Based Pulsed-Power Accelerator Model

For a given application, the optimum parameters of the accelerator components shown in FIG. 1 can be best determined through iterative numerical simulations. To begin such simulations, initial estimates of the parameters would be required. Estimates that are accurate to, at most, first order are presented below.

For the description below, it is assumed that a Marx-based pulsed-power accelerator that uses intermediate pulse-forming lines comprising intermediate store capacitors and laser-triggered gas switches is being designed to drive a z-pinch load. A desired peak pinch current, pinch implosion time, pinch length, and initial pinch radius are given by I, $\tau$, $\ell$, and R, respectively. These parameters determine the required pinch mass m, which is given approximately by the following expression:

$$m = (1.76 \times 10^{-8}) \frac{I^2 \tau_i^2 \ell}{R^2} \text{ kg}. \quad (2)$$

(Equations are in SI units throughout.) See W. A. Stygar et al., *Phys. Rev. E* 72, 026404 (2005).

The desired values of I and $\tau_i$ determine the required values of the peak electrical power at the vacuum-insulator stack $P_s$ and peak stack voltage $V_s$, according to $$P_s = (4.02 \times 10^{-18}) \frac{I^{8/3}}{\tau_i^{5/3}} W, \quad (3)$$

$$V_s = (4.31 \times 10^{-18}) \left(\frac{I}{\tau_i}\right)^{5/3} V. \quad (4)$$

See W. A. Stygar et al., *Phys. Rev. E* 72, 026404 (2005). Equations (3) and (4) assume that the minimum stack-MITL inductance required for reliable accelerator operation is approximately given by the following empirical relation:

$$L = (3.13 \times 10^{-11}) V_s^{2/5} H. \quad (5)$$

See W. A. Stygar et al., *Phys. Rev. E* 72, 026404 (2005).

The constants on the right-hand sides of Eqs. (2)-(5) can only be accurate when the shape of the pinch current, stack power, and stack voltage pulses are mathematically similar to the shapes assumed for the analysis by Stygar et al. The constants above are 5% less than those assumed by Stygar et al., since more recent stack-MITL-system designs for petawatt-class drivers suggest that the required minimum inductance L can be about 5% less than assumed previously. In addition, Eq. (5) implicitly assumes the use of anode plugs in the insulator stack. See W. A. Stygar et al., *Phys. Rev. ST Accel. Beams* 8, 050401 (2005). Eq. (5) also assumes that the stack-flashover probability is limited to less than $10^{-3}$, as predicted by the statistical flashover model developed by W. A. Stygar et al., in *Phys. Rev. ST Accel. Beams* 7, 070401 (2004).

The electrical power $P_s$ is delivered to the stack-MITL vacuum section by the water-section radial-line transformers. The impedance at the output of the radial lines $Z_{r,o}$ that maximizes the transfer of electrical energy from these lines to the stack-MITL section is approximately $$Z_{r,o} \sim \frac{L}{\tau_i}. \quad (6)$$

See K. W. Struve and D. H. McDaniel, *Proc. 12th Int. Conf. on High-Power Particle Beams* (Beams '98), IEEE, Haifa, Israel, p. 334 (1998).

The single-sided accelerator shown in FIG. 1 arbitrarily assumes 6 water-section radial lines (i.e., 3 triplates), which are electrically in parallel. For an accelerator with $n_r$ water-section radial lines, the impedance at the output of the radial lines (i.e., at the outer radius of the vacuum-insulator stack) is given by the following:

$$Z_{r,o} = \frac{60}{n_r \varepsilon^{1/2}} \left(\frac{g_{r,o}}{r_{r,o}}\right) \Omega. \quad (7)$$

In the above expression $\varepsilon$ is the dielectric constant of water, $g_{r,o}$ is the AK gap at the output of each of the $n_r$ radial lines, and $r_{r,o}$ is the radius at the output of the radial lines.

The electric field in the water radial lines is highest near their output; i.e., just outside the vacuum-insulator stack. To minimize the probability of water-dielectric breakdown in this region, the peak value (in time) of the mean electric field at the radial-line output $E_{r,o}$ must satisfy the following relation:

$$E_{r,o} \tau_{r,o}^{0.330} \leq 1.13 \times 10^5, \quad (8)$$

where $$E_{r,o} \equiv \frac{V_s}{g_{r,o}}, \quad (9)$$

and $\tau_{r,o}$ is the full width of the stack-voltage pulse at 63% of peak. See W. A. Stygar et al., *Phys. Rev. ST Accel. Beams* 9, 070401 (2006). The overall energy efficiency of the accelerator is optimized when $$\tau_{r,o} \sim \tau_i. \tag{10}$$

Equation (9) uses the peak voltage at the stack. The peak voltage in the radial lines is actually higher about 10-50 ns outside the stack, in the water, due the voltage that is reflected from the stack. However, for systems of interest, the radial-line AK gaps are also larger in this region. In addition, the effective pulse width of the voltage is shorter here than at the stack. Numerical calculations suggest that (for systems of interest) if the criterion given by Eq. (8) is met at the stack it will also be met near the stack.

When Eq. (6) is satisfied and the radial-line output impedance is well-matched to the stack-MITL inductance at z-pinch implosion times of interest, then $$P_s \sim P_{f,o}, \tag{11}$$

where $$P_{f,o} = \frac{V_{f,o}^2}{Z_{r,o}} \tag{12}$$

is the peak forward-going power at the output of the radial lines, and $V_{f,o}$ is the peak forward-going voltage.

Since the radial lines are impedance transformers, they approximately conserve electrical power. Hence $$P_{f,o} = \frac{V_{f,o}^2}{Z_{r,o}} = \eta \frac{V_{f,i}^2}{Z_{r,i}} = \eta P_{f,i}, \tag{13}$$

where $\eta$ is the power-efficiency of the transformers, $V_{f,i}$ is the peak forward-going voltage at the input of the radial lines, $Z_{r,i}$ is the impedance at the radial-line input, and $P_{f,i}$ is the peak forward-going power at the input.

Power is delivered to the input of the radial-line transformers from the intermediate-store capacitors. The radial-line input impedance $Z_{r,i}$ that maximizes the transfer of power from the intermediate stores to the radial lines is given by $$Z_{r,i} = Z_{IS,o} + R_{eff}, \tag{14}$$

where $Z_{IS,o}$ is the output impedance of the system of intermediate stores, and $$R_{eff} \sim \frac{L_g}{\tau_{IS}} + R_g. \tag{15}$$

In this expression, $L_g$ is the inductance of the system of laser-triggered gas switches, $\tau_{IS}$ is the two-way transit time of the intermediate-store capacitors, and $R_g$ is the characteristic resistance of the system of gas switches. The overall energy efficiency of the accelerator is optimized when $$\tau_{IS} \sim \tau_i. \tag{16}$$

Assuming that there are $n_r$ radial lines, the impedances $Z_{r,i}$ and $Z_{IS,o}$ are given by the following expressions:

$$Z_{r,i} = \frac{60}{n_r \varepsilon^{1/2}} \left( \frac{g_{r,i}}{r_{r,i}} \right), \tag{17}$$

$$Z_{IS,o} = \frac{60}{n_r \varepsilon^{1/2}} \left( \frac{g_{IS}}{r_{IS,o}} \right), \tag{18}$$

where $g_{r,i}$ is the AK gap at the input of each of the $n_r$ radial lines, $r_{r,i}$ is the radius at the input to the radial lines, $g_{IS}$ the AK gap of each of the intermediate stores, and $r_{IS,o}$ is the radius at the intermediate-store output. The AK gap of an intermediate store is assumed to be constant throughout the store's length.

For the accelerators considered herein, the length of the gas switch is ignored; hence $$r_{r,i} = r_{IS,o}. \tag{19}$$

Since the two-way transit time of the intermediate store is $\tau_{IS}$, then $$r_{IS,i} = r_{IS,o} + \frac{c\tau_{IS}}{2\varepsilon^{1/2}}. \tag{20}$$

The intermediate stores are typically charged on a time scale that is long compared to the time required to close the switches. Hence, the peak value of the intermediate-store voltage $V_{IS}$ can be assumed to be the same throughout the store's length, and that at peak voltage, the peak forward-going voltage in the intermediate stores is $V_{IS}/2$. Using this assumption, the peak forward-going voltage at the input to the radial lines $V_{f,i}$ is approximately $$V_{f,i} \sim \frac{V_{IS}}{2}. \tag{21}$$

The actual value of $V_{f,i}$ is somewhat greater than that predicted by Eq. (21), since the intermediate stores are still charging when the gas switches fire. To minimize the probability of dielectric breakdown in the intermediate stores, the peak value (in time) of the mean electric field in the intermediate stores $E_{IS}$ must satisfy the following relation:

$$E_{IS} \tau_{IS}^{0.330} \leq 1.13 \times 10^5, \tag{22}$$

where $$E_{IS} \equiv \frac{V_{IS}}{g_{IS}}, \tag{23}$$

The quantity $\tau_{IS}$ is the full width of the intermediate-store voltage pulse at 63% of peak. See W. A. Stygar et al., *Phys. Rev. ST Accel. Beams* 9, 070401 (2006).

The intermediate stores receive their energy from the Marx generators. It is straightforward to show that the transfer of energy from the Marxes to the intermediate stores is maximized when $$\frac{\tau_{IS}}{Z_{IS,i} + Z_{IS,o}} = C_{IS} \leq C_M, \quad (24)$$

where $C_{IS}$ is the capacitance of the system of intermediate stores, and $C_M$ is the capacitance of the system of Marx generators (after they have erected). The capacitance $C_M$ is given by $$C_M = \frac{n_M C_s}{n_c}, \quad (25)$$

where $n_M$ is the number of Marx generators, $C_s$ is the capacitance of a single Marx capacitor, and $n_c$ is the number of capacitors in each Marx. The optimum value of $C_M$ given by Eq. (24) is somewhat larger than $C_{IS}$ because of the resistance of the Marx generators. In the absence of resistive losses, and assuming that there is an inductor between the Marx generators and intermediate stores, it can be shown that all of the Marx energy is transferred to the intermediate stores when $C_{IS}=C_M$.

When Eqs. (24) and (25) are satisfied, then $$V_{IS} \approx V_M \equiv n_c V_c \quad (26)$$

where $V_M$ is the maximum peak voltage that can be achieved by the erected Marx generators, and $V_c$ is the initial DC voltage to which each of the Marx capacitors is charged. The required value of the total initial energy stored in the Marx generators $E_M$ can be expressed as:

$$E_M = \frac{1}{2} C_M V_M^2 = \frac{n_M n_c}{2} C_s V_c^2. \quad (27)$$

Additional information needs to be provided to close the above system of equations. For the exemplary single-sided 100-ns, 500 TW accelerator described below, the following simplifying assumptions are made:

$$\epsilon = 80, \quad (28)$$

$$n_r = 6, \quad (29)$$

$$\eta = 0.8, \quad (30)$$

$$L_g = \frac{400\ nH}{n_g}, \quad (31)$$

$$R_g = \frac{200\ m\Omega}{n_g}, \quad (32)$$

$$n_g = 2\ n_M, \quad (33)$$

$$V_{IS} = 5\ MV, \quad (34)$$

$$\tau_{IS} = 410\ ns, \quad (35)$$

$$n_c = 60, \quad (36)$$

$$C_s = 1.34\ \mu F, \quad (37)$$

$$V_c = 90\ kV. \quad (38)$$

As indicated by Eqs. (7), (17), and (18), the required value of a radial line's anode-cathode gap increases as $\epsilon^{1/2}$. Hence water is an attractive insulating medium, since its high dielectric constant (about 80) reduces considerably the electric field in the radial lines and intermediate stores.

The single-sided 100-ns, 500-TW accelerator assumes 6 radial-line transformers (i.e., 3 triplates) [Eq. (29)]. For comparison, the Z accelerator successfully uses, in effect, 4 transmission lines. A detailed study would be required to determine the optimum value of $n_r$ for a given set of conditions.

The power-efficiency of the radial-line transformers $\eta$ [Eq. (30)] is a function of the impedance ratio of the transformers $Z_{r,o}/Z_{r,i}$, the distance over which the impedance transformation is performed, the shape of the impedance profile, the shape of the power pulse, and the water resistivity. Hence the efficiency is best determined numerically. For the 100-ns, 500-TW accelerator example considered below, the power efficiency of the transformer system (when terminated in a matched load) was determined from numerical simulations to be 82%.

Equations (31) and (32) assume that the inductance and characteristic resistance of each switch is 400 nH and 200 m$\Omega$, respectively. The quantity $n_g$ is the total number of switches that can be installed in the accelerator, which is determined by r,i, the radius at which the switches are located, and various engineering and operational constraints. In addition to these constraints, it is preferable to have an integral number of switches per intermediate-store capacitor. For the accelerators described herein, Eq. (33) can be safely assumed.

Equation (34) makes the simplifying assumption that the gas switches can be operated reliably when the peak intermediate-store voltage is 5 MV, which is approximately at the operating point of the laser-triggered gas switches used in the Z accelerator. Equation (35) is obtained from numerical circuit simulations. Equation (36) assumes that each Marx generator consists of 60 capacitors, and Eq. (37) assumes each Marx capacitor has a capacitance of 1.34 p F. Equation (38) assumes each Marx capacitor is initially charged to 90 kV. Equations (36)-(38) are essentially identical to the Marx parameters of the Z accelerator.

Although not directly relevant to the electrical design of an accelerator, it is useful to obtain an estimate of the outer radius of the accelerator's oil tank. For the Marx-based accelerators considered herein, the minimum value of the outer tank radius $r_t$ is approximately given by:

$$r_t = r_{IS,o} + 6.5\ m. \quad (39)$$

Most of the above assumptions are also used for the exemplary single-sided 250-ns, 460-TW accelerator, and in addition, the two-sided 100-ns, 680-TW accelerator described below. Deviations from Eqs. (28)-(38) are described below in the descriptions of these accelerators.

Scaling of I with Other Accelerator Parameters

The above equations can be used to determine how the peak pinch current I scales with other accelerator parameters. Combining Eqs. (3) and (11)-(13), and assuming $\eta$ is approximately constant for accelerators of interest, the following expression is obtained:

$$I \propto P_{f,i}^{3/8} \tau_i^{5/8}. \quad (40)$$

Combining Eqs. (13), (14), (21), (24)-(27), and (40), and assuming $$\frac{L_g}{\tau_{IS}} \ll Z_{IS,o}, \quad (41)$$

$$R_g \ll Z_{IS,o}, \quad (42)$$

then $$I \propto E_M^{3/8} \tau_i^{1/4}. \quad (43)$$

According to Eqs. (40) and (43), the peak current I does not scale simply as $P_{f,i}^{1/2}$ and $E_M^{1/2}$, as might be expected, since Eq. (3) assumes that the minimum value of the initial stack-MITL-system inductance L scales as indicated by Eq. (5). See W. A. Stygar et al., *Phys. Rev. E* 72, 026404 (2005).

Assuming Eqs. (13), (14), (18), (21), and (40)-(42), and also that $$V_{IS} \propto g_{IS} \quad (44)$$

in order to satisfy Eq. (22), a relation between I, $V_{IS}$, $r_{IS,o}$, and $\tau_i$ can be obtained:

$$I \propto (V_{IS} r_{IS,o})^{3/8} \tau_i^{1/4}. \quad (45)$$

Hence Eqs. (39) and (45) suggest that for a given pinch current I and implosion time $\tau_i$, the outer tank radius $r_t$ can be decreased if the intermediate-store voltage $V_{IS}$ is increased.

As described above, there are several transfers of electrical power from one accelerator component to another. None of these transfers occurs with perfect efficiency. Equations (40), (43), and (45) do not account for any transfer efficiencies; hence these scaling relations implicitly assume that these efficiencies remain constant for systems of interest.

Several Examples of Marx-Based Pulsed-Power Accelerators

Single-Sided 100-ns, 500-TW Accelerator

The single-sided Marx-based pulsed-power accelerator architecture shown in FIG. 1 was used to design a z-pinch driver that produces a 100-ns, 500-TW electrical power pulse. The accelerator parameters for this design are summarized in columns A1, A2, and A3 of Table I. The accelerator architecture is identical for these three examples; the only difference between these is the design of the z-pinch load.

Iterative numerical circuit simulations were performed to develop an optimized circuit model of the accelerator. Initial estimates of the accelerator-circuit parameters (which were used for the simulations) were determined assuming Eqs. (2)-(38); the desired z-pinch parameters that were assumed are as follows:

$$I \sim 45 \text{ MA}, \quad (46)$$

$$\tau_i \sim 90 \text{ ns}, \quad (47)$$

$$\ell = 10 \text{ mm}, \quad (48)$$

$$R = 10 \text{ mm}. \quad (49)$$

Equations (46)-(49) correspond to the z-pinch parameters of Example A1. The simulations were conducted using the SCREAMER circuit code. The z-pinch load is modeled in SCREAMER as an imploding cylindrical foil with perfectly stable and infinitely thin walls. See M. L. Kiefer and M. M. Widner, *Proc. 5th IEEE Int. Pulsed Power Conf.*, IEEE, Piscataway, N.J., p. 685 (1985).

A circuit to satisfy approximately the constraints given by Eqs. (5)-(29), (31), (33)-(38), and (46)-(49) was developed. The numerical simulations did not assume Eq. (28), but instead that the switch resistance falls from a high initial value to 200 mΩ in an exponential decay with a 10-ns time constant. Under these constraints, the optimum values of $r_{IS,i}$, $r_{IS,o}$, $r_{r,i}$, $r_{r,o}$, $Z_{IS,i}$, $Z_{IS,o}$, $Z_{r,i}$, and $Z_{r,o}$ were numerically determined. The optimum values were defined to be those which maximize the efficiency of delivering energy from the Marx generators to the z-pinch load. The optimum values are approximately as follows:

$$r_{IS,i} = 45.4 \text{ m}, \quad (50)$$

$$r_{IS,o} = r_{r,i} = 43.9 \text{ m}, \quad (51)$$

$$r_{r,o} = 2.7 \text{ m}, \quad (52)$$

$$Z_{IS,i} = 8.9 \text{ m}\Omega, \quad (53)$$

$$Z_{IS,o} = 9.2 \text{ m}\Omega, \quad (54)$$

$$Z_{r,i} = 16.2 \text{ m}\Omega, \quad (55)$$

$$Z_{r,o} = 250 \text{ m}\Omega. \quad (56)$$

For the conditions described above, the required number of Marx generators $n_M$ is 300. If there are two intermediate-store capacitors per Marx, the impedance of each store is 5.4Ω.

The analytic accelerator model described above assumes a transformer efficiency of η=0.8 [Eq. (30)]. The numerical simulations did not make this assumption, but instead included a 1D model of the transformer and calculated the actual transformer efficiency. The numerical calculations included effects due the exponential impedance profile and, in addition, the water resistivity.

As indicted in Table I, the circuit model assumes that the water resistivity is 3.0 MΩ-cm. This is a factor of two higher than the nominal resistivity routinely achieved on the Z accelerator. Presently, the Z accelerator water is processed using resin beds. However, the use of a reverse-osmosis electric-discharge-ionization treatment is expected to routinely provide resistivities on the order of 3.0 MΩ-cm, even though the water volume of the higher-power accelerators considered here would be a factor of about 20 greater than it is for Z.

When the water resistivity is 3.0 MΩ-cm, the numerical simulations show that the intrinsic power efficiency of the radial-line transformer described above is 82%. This is the efficiency obtained when the transformer is terminated in a matched load. When the water resistivity is assumed to be infinite, the power efficiency increases to 88%. The corresponding energy efficiencies of the transformer are 80% and 86%, respectively.

Once an optimized accelerator circuit was developed for Example A1, this circuit was used to drive two other z-pinch loads, and in this manner Examples A2 and A3 were developed. The pinch geometry for Example A2 was identical to that of A1; however the pinch mass of A2 was chosen to be that which gives a 120-ns implosion time. The pinch of Example A3 had twice the length of Example A1; the mass was chosen to achieve the same implosion time as for Example A1.

Figure 2:
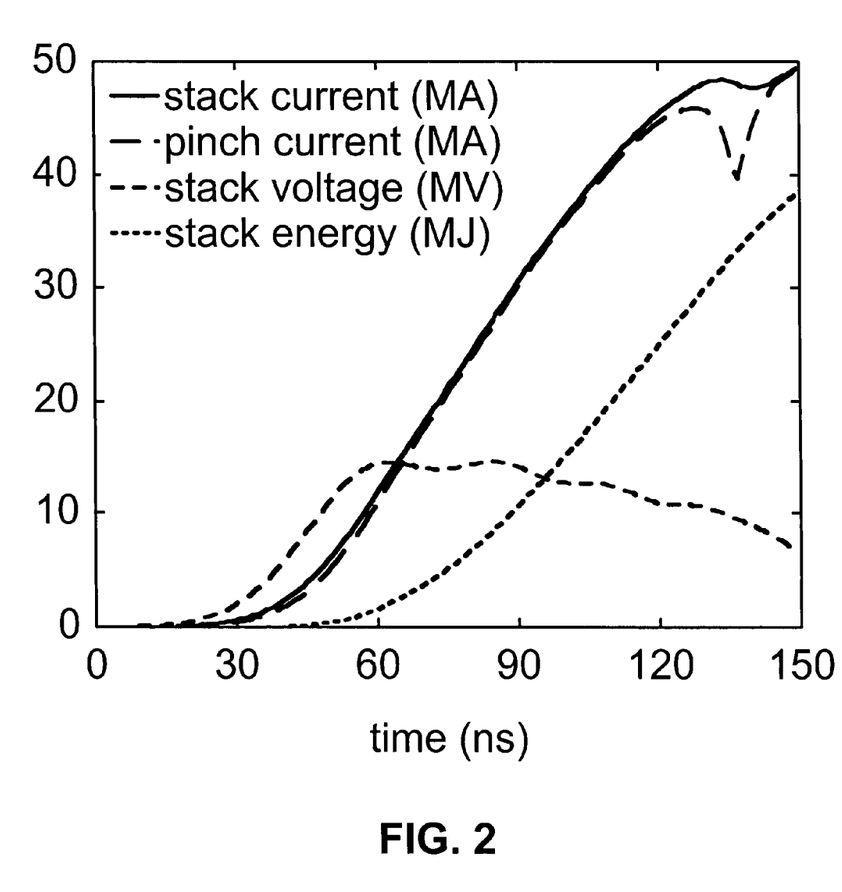
FIG. 2 shows a plot of the stack current, pinch current, stack voltage, and stack energy for the single-sided Marx-based accelerator-pinch configuration referred to as Example A1 in Table 1.

The numerical simulations predicted that for these three examples, the peak values (in time) of the power, voltage, and energy at the stack, and the peak pinch current, are as listed in Table I. In FIG. 2 is plotted the time-dependent stack current, pinch current, stack voltage, and stack energy for Example A1. The peak pinch current (before pinch stagnation) is 46 MA, the peak stack voltage is 14 MV, and the electromagnetic energy delivered to the stack by the time the pinch stagnates on axis is 33 MJ. The simulations made the simplifying assumption that electron-flow effects in the MITLs can be modeled according to the model of Struve et al., and that $Z_{\mathit{flow}}$=0.5 ohms. See K. W. Struve et al., *Proc. 11$^{th}$ IEEE Int. Pulsed Power Conf.*, p. 162 (1997). Also listed in Table I are the predicted pinch implosion velocities and kinetic energies.

Experiments conducted on the Z accelerator demonstrate that the total x-ray energy radiated by a pinch with the parameters listed in the Z-accelerator column of Table I is 1.6 MJ, a factor of 2.46 greater than the nominal pinch kinetic energy of 0.65 MJ given in the table. This factor of 2.46 was assumed to estimate the total radiated x-ray yields for Examples A1, A2, and A3.

Single-Sided 200-ns, 460-TW Accelerator

The single-sided Marx-based pulsed power accelerator architecture shown in FIG. 1 was also applied to the design of a 250-ns, 460-TW z-pinch driver. The accelerator parameters assumed for this design are summarized in the column labeled "Example B" of Table I.

Example B was developed to determine how much the pinch current increases if the total Marx energy $E_M$, capacitance of each Marx capacitor $C_s$, and pinch implosion time $\tau_i$ are increased a factor of about 2 above the levels of Examples A1, A2, and A3, to the following values $$E_M = 195 \text{ MJ}, \tag{57}$$

$$C_s = 2.68 \text{ }\mu\text{F}, \tag{58}$$

$$\tau_i = 240 \text{ ns}. \tag{59}$$

Assuming these three constraints, and the constraints imposed by Eqs. (5)-(29), (33), (34), (36), (38), (48), and (49), iterative SCREAMER circuit simulations were performed to develop an optimized accelerator circuit. Instead of using Eq. (31), the following was assumed $$L_g = \frac{1200 \text{ } nH}{n_g} \tag{60}$$

to achieve the desired lengthening of the power pulse. Eq. (32) was also not used, and instead the gas-switch-resistance model described above for the 100-ns, 500-TW single-sided accelerator was used.

The performance parameters of the optimized circuit for Example B are summarized in Table I. Since Example B had the same number of switches as Examples A1, A2, and A3, each switch of Example B transferred approximately twice the charge per switch per shot as do the other three examples.

As indicated by Table I, the pinch current of Example B was a factor of 1.63 greater than it was for Example A1. This ratio agrees, to first order, with Eq. (43), which predicts an increase of a factor of 1.69. The pinch of Example B can radiate at least twice as much x-ray energy as either Examples A1, A2, or A3.

Two-Sided 100-ns, 680-TW Pulsed-Power Accelerator

Since Examples A1, A2, A3, and B all assume the architecture shown in FIG. 1, they provide a single power feed to a z-pinch load. Successful operation of a double-pinch-driven hohlraum for ICF may, however, ultimately require two parallel feeds.

Figure 3:
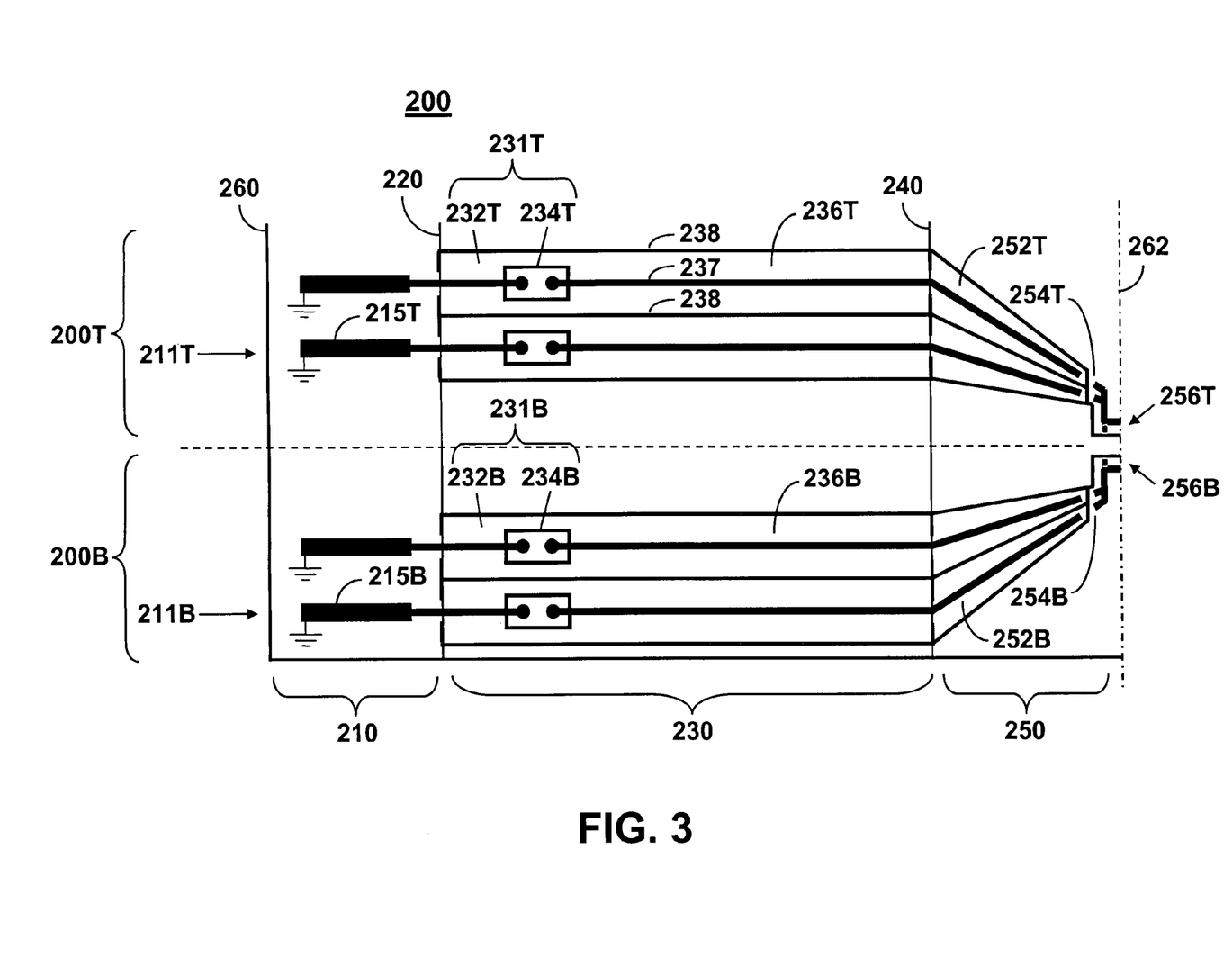
FIG. 3 shows a schematic illustration of a two-sided pulsed-power accelerator. The accelerator can provide a two-sided current drive for a double-pinch-driven hohlraum, or for any other type of electrical load that requires a two-sided drive.

An architecture for a pulsed-power accelerator that provides a two-sided drive is shown in FIG. 3. The two-sided accelerator 200 comprises a bottom-side accelerator 200B and a top-side accelerator 200T that operate in parallel, each of which has an architecture similar to that of the single-sided accelerator 100 described above. The two-sided accelerator 200 comprises an oil section 210, a water section 230, and a vacuum section 250 that can be concentric about a symmetry axis 262 within a cylindrical tank 260. An insulating oil-water interface 220 separates the oil section 210 from the water section 230, and a vacuum insulator stack 240 separates the water section 230 from the vacuum section 250. The oil section 210 comprises at least one pulse generator level 211B, having a plurality of pulse generators 215B, on the bottom side 200B and at least one level 211T of pulse generators 215T on the top side 200T. The water section 230 comprises pulse-forming circuits 231B and 231T that can comprise one or more water-dielectric intermediate-store capacitors 232B and 232T for each pulse generator 215B and 215T and one or more switches 234B and 234T for each intermediate-store capacitor 232B and 232T on the bottom and top sides 200B and 200T. The water section 230 further comprises a level of monolithic triplate radial-transmission-line impedance transformers 236B and 236T for each pulse generator level 211B and 211T on the bottom and top sides 200B and 200T. Each triplate radial line 236B or 236T has a cathode 237 and outer anodes 238. The radial-line transformers have variable, preferably approximately exponential, impedance profiles. The AK gaps of the transformer lines 236B and 236T can vary radially to provide the variable impedance profile. The vacuum section 250 comprises a level of triplate MITLs 252B and 252T for each pulse-generator level 211B and 211T on the bottom and top sides 200B and 200T. The MITLs 252B on the bottom side 200B can feed a bottom-side vacuum convolute 254B to drive a bottom-side load 256B and the MITLs 252T on the top side 200T can feed a separate top-side vacuum convolute 254T to drive a top-side load 256T.

This two-sided pulsed-power accelerator architecture was applied to the design of Example C, a two-sided Marx-based 100-ns z-pinch driver that produces 340 TW of electrical power per side, or 680 TW total. As indicated by FIGS. 1 and 3, and Table I, Example C is essentially two parallel 4-level ($n_r$=4) versions of Example A1. The accelerator and pinch parameters that are achieved when the accelerator circuit is optimized for this design are summarized in the column labeled "Example C" of Table I. Example C can deliver 39 MA to each of the two pinches, which are electrically in parallel. This system is expected to radiate 7.6 MJ per pinch, or a total of 15.2 MJ.

LTD-Based Pulsed-Power Accelerator

LTD technology is being developed and is becoming an attractive alternative to conventional Marx generators. See C. L. Olson, "Inertial confinement fusion: z-pinch", Chapter 9, *Landholt-Boernstein Handbook on Energy Technologies*, editor-in-chief: W. Martienssen, volume VIII/3 of Fusion Technologies, edited by K. Heinloth, (Springer-Verlag, Berlin-Heidelberg, 2005); M. G. Mazarakis et al., *Proc. 13$^{th}$ IEEE Int. Pulsed Power Conf.*, IEEE, Piscataway, N.J., p. 587 (2001); M. G. Mazarakis et al., to be published in the *Proc. 15$^{th}$ IEEE Int. Pulsed Power Conf.*, IEEE, Piscataway, N.J., (2005); A. A. Kim and B. M. Kovaltchuk, *Proc. 1$^{st}$ Int. Conf. Radiation Physics, High Current Electronics, and Modifica-

*tions of Materials*, Institute of High Current Electronics, Tomsk, Russia, p. 263 (2000); M. G. Mazarakis and R. B. Spielman, *Proc. 12th IEEE Int. Pulsed Power Conf.*, IEEE, Piscataway, N.J., p. 412 (1999); and S. T. Rogowski et al., to be published in the *Proc. 15th IEEE Int. Pulsed Power Conf.*, IEEE, Piscataway, N.J., (2005). The LTD-based architecture described herein differs from previous proposed LTD-based accelerators, since the previous designs assume that each LTD directly drives a long coaxial vacuum MITL. The long MITLs are operated in the self-limited mode, and are combined by a vacuum convolute that in turn drives a radial MITL section. Much of the flow-electron current launched in the long coaxial MITLs is lost at the vacuum convolute. Conversely, according to the present invention, each LTD directly drives a coaxial liquid-dielectric (e.g., oil or water) transmission line, which in turn drives a water-dielectric triplate radial-transmission-line impedance transformer, which has an approximately exponential impedance profile. The several stacked levels of radial-line transformers offer a straightforward and efficient method of combining the outputs of several-hundred terawatt-level LTDs to produce a petawatt-level power pulse, which in turn can be used to drive a z-pinch implosion.

Figure 4:
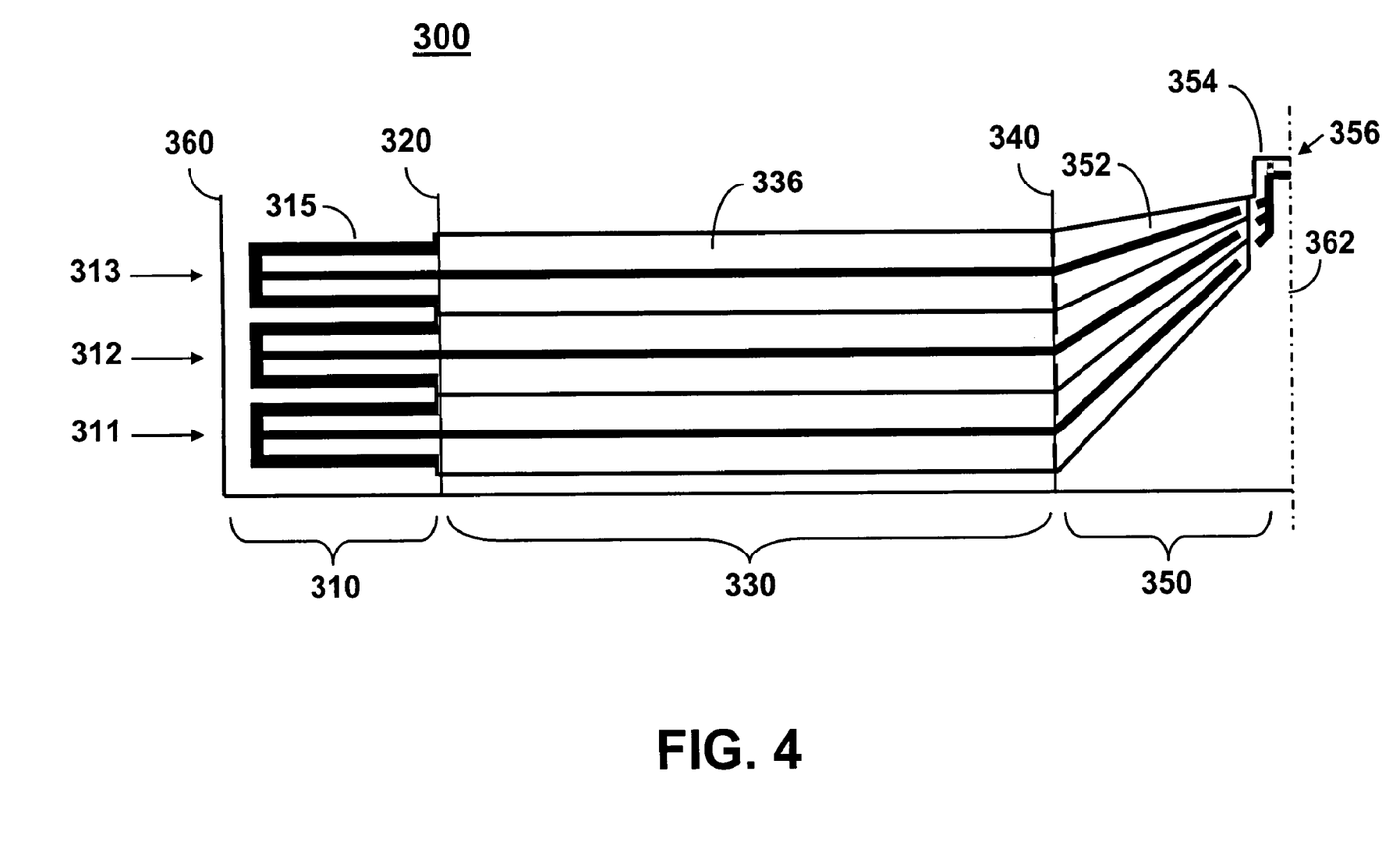
FIG. 4 shows a schematic illustration of a single-sided pulsed-power accelerator. The architecture illustrated here is identical to that shown in FIG. 1, except that fast pulse generators (e.g, LTDs) are used, eliminating the need for pulse-forming circuits in the water section.

A pulsed-power accelerator 300 that does not use an intermediate pulse-forming circuit is shown in FIG. 4. The accelerator 300 comprises an oil section 310, a water section 330, and a vacuum section 350. The water section 330 is located within the oil section 310, and the vacuum section 350 lies within the water section 330. The oil section 310 is separated from the water section 330 by an oil-water interface 320 and the water section 330 is separated from the vacuum section 350 by a vacuum-insulator stack 340. The three sections 310, 330, and 350 can lie within a cylindrical tank 360, and can be concentric about a cylindrical symmetry axis 362. The pulsed-power accelerator 300 can be single-sided (as shown) or two-sided to drive an electrical load from one- or two-sides.

The oil section 310 comprises at least one level 311 of fast-pulse generators 315. Preferably, the fast-pulse generator 315 comprises an annular LTD pulse generator (as shown), but can also be a fast Marx generator or other pulse generator capable of generating a fast high-voltage power pulse. Additional levels 312 and 313 can be stacked on the bottom level 311. The outer diameter of the oil section 310, and the number of fast-pulse generator levels 311, can be determined by the required number of fast-pulse generators 315. This in turn can be determined by the electrical power produced by each fast-pulse generator 315, and the total required electrical power. The specific example shown in FIG. 4 assumes a single-sided accelerator with three fast-pulse-generator levels.

The water section 330 comprises a stacked monolithic triplate radial-transmission-line impedance transformer 336 for each fast-pulse-generator level 311. The triplate radial lines 336 have variable impedance profiles. The impedance profiles of the triplate radial lines 336 are preferably approximately exponential. The radial lines 336 perform the same functions for the pulsed-power accelerator 300 as they do for the pulsed-power accelerators 100 and 200 described above. The fast-pulse generators 315 launch electrical power pulses at the input to the radial lines 336. A combined radially converging power pulse subsequently propagates in the radial lines 336 toward the vacuum section 350, which is located at the center of the accelerator 300. Importantly, the water section 330 of the accelerator 300 is completely passive, and does not use pulse-forming circuits, intermediate store-capacitors, or switches, as are used in many conventional pulsed-power accelerator designs.

The vacuum section 350 comprises the vacuum-insulator stack 340, a triplate vacuum-transmission line 352 for each fast-pulse-generator level 311, a vacuum convolute 354, and an electrical load 356 which can be a z pinch. The vacuum section 350 shown in FIG. 4 has 3 triplate MITLs, to match the 3 triplate radial lines in the water section, and the 3 fast-pulse-generator levels in the oil section. The currents at the outputs of the 3 triplate MITLs can be added by a triple-post-hole convolute; the combined current can then be delivered by the convolute to the electrical load.

Advantages of an LTD-Based Pulsed-Power Accelerator

The fast LTD-based architecture of the type shown in FIG. 4 offers several advantages over the slower Marx-based architecture of the type shown in FIG. 1; the most significant are described below. Conventional slow Marx generators (~1 μs) require additional pulse-compression circuitry to achieve the fast (<<1 μs) pulses required to drive z-pinch implosions. The Marx-based architecture shown in FIG. 1 assumes this circuitry consists of intermediate-store capacitors (which also serve as pulse-forming transmission lines) and switches. Present laser-triggered gas switches have a failure rate that would require frequent draining of the water section to replace failed switches. The switches used within the LTDs operate at much lower voltages than the gas switches of a Marx-based accelerator, enabling much longer lifetimes. Further, the LTD switches run on dry air, and do not require sulfur hexafluoride, as do laser-triggered gas switches. Finally, since the LTD switches are electrically triggered, no UV laser-trigger systems are required for an LTD-based accelerator; hence the maintenance, repair, and alignment of these systems is avoided. Consequently, the water-section of the LTD-based accelerator can be completely passive, since it would not contain any switches, and would need to be drained only infrequently, which would facilitate keeping the water resistivity at a high level, thereby increasing the efficiency of the water-section impedance transformers.

Performance Parameters of an LTD-Based Accelerator

Using existing technology, a single LTD cavity that is 3-m in diameter can produce a 100-kV 1-MA (0.1 TW) electrical-power pulse. The full-width-at-half-maximum of the power pulse is about 100 ns. Each such LTD cavity is 20-cm long. When 60 cavities are stacked in series to form a 12-m-long LTD pulse generator, which is also referred to as an LTD "module", the module can produce a 6-TW electrical power pulse. Assuming a center-to-center spacing of LTD modules of 3.3 m, and also assuming that the outer tank diameter is 104 m, 70 LTDs can be fit in each of the 3 levels illustrated in FIG. 4, for a total of 210 LTDs. The total forward-going electrical power and energy launched at the input of the radial-transmission-line impedance transformers of such an LTD-based accelerator is 1260 TW and 126 MJ, respectively. Approximately 1000 TW would arrive at the vacuum insulator stack. Such a power pulse delivers about 60 MA to a 10-mm-diameter 10-mm-length z pinch that implodes in about 90 ns. Such a pinch would radiate about 17 MJ. These estimates are summarized in Table II.

Increasing the Electrical Power of the Pulsed-Power Accelerators

Higher accelerator powers, in excess of 1000 TW, may be required to achieve z-pinch-driven ICF, with thermonuclear yields in excess of 400 MJ. These powers can be achieved by conceptually straightforward upgrades to the example Marx-based and LTD-based accelerator designs described above.

Such upgrades include the following:

(i) Increasing the outer diameter of the accelerator tank. This enables an increase in the number of electrical pulse generators, which would increase the peak forward-going power $P_{f,i}$ that is launched at the input to the radial-transmission-line impedance transformers.

(ii) Increasing the forward-going power $P_{f,i}$ by replacing the electrical pulse generators with more powerful versions of these drivers. The Marx-based accelerators can be upgraded by increasing the voltage at which the Marxes, intermediate stores, and gas switches operate. Or, the simple transmission-line pulsers assumed for the water sections of the example Marx-based accelerators described above can be replaced with Blumleins, providing an increase in the forward-going power. The LTD-based accelerator can be upgraded by adding more LTD cavities to each of the LTD modules, or by using higher-performance capacitors and switches with the LTDs.

(iii) Increasing the number of levels. For the accelerators shown in FIGS. 1 and 4, increasing the number of levels from 6 to 8 would increase the forward going power $P_{f,i}$ by 33%, and according to Eq. (40), the peak pinch current I by 11%.

(iv) Increasing the overall accelerator efficiency. The efficiency can be improved by reducing the series resistance of the electrical pulse generators, increasing the water resistivity (of the water section) above 3 MΩ-cm, developing an impedance profile for the water-section transformers that is more efficient than the exponential profile, or reducing the value of the initial stack-MITL inductance L at which the accelerator can be reliably operated.

(v) Decreasing the temporal width of the power Pulse produced by the electrical pulse generators. The pulse can be decreased by adding pulse-compression circuitry to the architectures of FIGS. 1, 3, and 4. Decreasing the pulse may increase the peak electrical power of the accelerator, which may improve the radiation efficiency of the accelerator-pinch system. See W. A. Stygar et al., *Phys. Rev. E* 72, 026404 (2005).

Table I. Accelerator and z-pinch parameters for several Marx-based-accelerator examples. The parameters are compared to those of the present Z accelerator. For Examples A1, A2, and A3, the accelerator architecture is identical; the only difference between these is the design of the z-pinch load. For the Z accelerator and all five higher-current examples, the initial pinch radius is assumed to be 10 mm. The nominal values of the peak pinch implosion velocity and kinetic energy assume a 10:1 pinch-radius convergence ratio.

| Accelerator and pinch parameters | Present Z accelerator | Example A1 | Example A2 | Example A3 | Example B | Example C |
|---|---|---|---|---|---|---|
| Outer tank diameter $r_t$ | 33 m | 104 m | 104 m | 104 m | 104 m | 104 m |
| Number of Marx generators $n_M$ | 36 | 300 | 300 | 300 | 300 | 200 (per side) |
| Number of capacitors per Marx $n_c$ | 60 | 60 | 60 | 60 | 60 | 60 |
| Capacitance of a single Marx capacitor $C_s$ | 1.34 μF | 1.34 μF | 1.34 μF | 1.34 μF | 2.68 μF | 1.34 μF |
| Initial Marx charge voltage $V_c$ | 90 kV | 90 kV | 90 kV | 90 kV | 90 kV | 90 kV |
| Initial Marx energy $E_M$ | 12 MJ | 98 MJ | 98 MJ | 98 MJ | 195 MJ | 65 MJ (per side) |
| Water resistivity | 1.5 MΩ/cm | 3.0 MΩ/cm | 3.0 MΩ/cm | 3.0 MΩ/cm | 3.0 MΩ/cm | 3.0 MΩ/cm |
| Peak intermediate-store voltage$_{IS}$ | 5 MV | 5 MV | 5 MV | 5 MV | 5 MV | 5 MV |
| $E_{IS}\tau_{IS}^{0.330}$ | $1.05 \times 10^5$ | $1.13 \times 10^5$ | $1.13 \times 10^5$ | $1.13 \times 10^5$ | $1.13 \times 10^5$ | $1.13 \times 10^5$ |
| Number of laser-triggered gas switches $n_g$ | 36 | 600 | 600 | 600 | 600 | 400 (per side) |
| Nominal charge transferred per laser-triggered gas switch | 120 mC | 60 mC | 60 mC | 60 mC | 120 mC | 60 mC |
| Number of water-section impedance transformers $n_r$ | 4 | 6 | 6 | 6 | 6 | 4 (per side) |
| Insulator-stack radius $r_{r,o}$ | 1.7 m | 2.7 m | 2.7 m | 2.7 m | 2.7 m | 2.7 m |
| Initial inductance of the stack-MITL system L | 13 nH | 23 nH | 23 nH | 23 nH | 19 nH | 21 nH (per side) |
| Peak electrical power at the stack $P_s$ | 55 TW | 500 TW | 500 TW | 500 TW | 460 TW | 340 TW (per side) |
| Peak stack voltage $V_s$ | 3.1 MV | 14 MV | 14 MV | 14 MV | 8.7 MV | 12 MV |
| $E_{r,o}\tau_{r,o}^{0.330}$ | $1.10 \times 10^5$ | $1.13 \times 10^5$ | $1.13 \times 10^5$ | $1.13 \times 10^5$ | $1.13 \times 10^5$ | $1.13 \times 10^5$ |
| Peak pinch current I | 19 MA | 46 MA | 53 MA | 39 MA | 75 MA | 39 MA (per side) |
| Energy delivered to the stack at z-pinch stagnation | 3.3 MJ | 33 MJ | 40 MJ | 30 MJ | 66 MJ | 23 MJ (per side) |
| Length of the z-pinch load $\ell$ | 10 mm | 10 mm | 10 mm | 20 mm | 10 mm | 10 mm (per side) |
| Z-pinch mass m | 5.9 mg | 34 mg | 82 mg | 54 mg | 750 mg | 25 mg (per side) |
| Effective pinch implosion time $\tau_i$ | 95 ns | 90 ns | 120 ns | 90 ns | 260 ns | 90 ns |

| Accelerator and pinch parameters | Present Z accelerator | Example A1 | Example A2 | Example A3 | Example B | Example C |
|---|---|---|---|---|---|---|
| Nominal peak pinch implosion velocity | 47 cm/µs | 50 cm/µs | 37 cm/µs | 50 cm/µs | 17 cm/µs | 50 cm/µs |
| Nominal peak pinch kinetic energy | 0.65 MJ | 4.3 MJ | 5.7 MJ | 5.7 MJ | 11 MJ | 3.1 MJ (per side) |
| Estimated total radiated x-ray energy | 1.6 MJ | 10 MJ | 14 MJ | 14 MJ | 28 MJ | 7.6 MJ (per side) |

Table II. Accelerator and z-pinch parameters for an LTD-based z-pinch driver. The parameters are compared to those of the existing Z accelerator. For both the Z and LTD accelerators, the initial pinch radius is assumed to be 10 mm. The nominal values of the peak pinch kinetic energy assume a 10:1 pinch convergence ratio.

| Accelerator and pinch parameters | Present Z accelerator | LTD-based accelerator |
|---|---|---|
| Outer tank diameter $r_t$ | 33 m | 104 m |
| Number of pulse generators | 36 5-MV Marx generators | 210 6-MV LTDs |
| Initial inductance of the stack-MITL system L | 13 nH | 28 nH |
| Peak electrical power at the stack $P_s$ | 55 TW | 1000 TW |
| Peak stack voltage $V_s$ | 3.1 MV | 22 MV |
| Peak pinch current I | 19 MA | 60 MA |
| Energy delivered to the stack at z-pinch stagnation | 3.3 MJ | 55 MJ |
| Length of the z-pinch load $\ell$ | 10 mm | 10 mm |
| Z-pinch mass m | 5.9 mg | 58 mg |
| Effective pinch implosion time $\tau_i$ | 95 ns | ~90 ns |
| Nominal peak pinch kinetic energy | 0.65 MJ | 6.8 MJ |
| Estimated total radiated x-ray energy | 1.6 MJ | 17 MJ |

The present invention has been described as a petawatt pulsed-power accelerator. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A pulsed-power accelerator, comprising:
an oil section comprising one or more pulse generator levels, each level having a plurality of pulse generators and wherein each pulse generator stores electrical energy for generating a forward-going power pulse;
a water section comprising a monolithic triplate radial-transmission-line impedance transformer for each of the one or more pulse generator levels, wherein each radial-transmission-line impedance transformer has a variable impedance profile, for combining the forward-going power pulses and propagating a combined radially converging power pulse; and
a vacuum section comprising a triplate vacuum-transmission line for each of the monolithic triplate radial-transmission-line impedance transformers, for delivering the combined radially converging power pulse to an electrical load.

2. The pulsed-power accelerator of claim 1, wherein the pulse generator comprises a Marx generator.

3. The pulsed-power accelerator of claim 1, wherein the pulse generator comprises one or more capacitors.

4. The pulsed-power accelerator of claim 1, wherein the pulse generator comprises a pulse transformer.

5. The pulsed-power accelerator of claim 1, wherein the pulse generator comprises a linear inductive voltage adder.

6. The pulsed-power accelerator of claim 1, wherein the pulse generator comprises a dielectric cavity adder.

7. The pulsed-power accelerator of claim 1, wherein the pulse generator comprises a linear-transformer driver.

8. The pulsed-power accelerator of claim 1, further comprising an intermediate pulse-forming circuit in the water section for each of the pulse generators in the oil section, that forms the forward-going power pulse from each pulse generator prior to their combination by the monolithic triplate radial-transmission-line impedance transformer.

9. The pulsed-power accelerator of claim 8, wherein the pulse-forming circuit comprises one or more intermediate-store capacitors for each pulse generator.

10. The pulsed-power accelerator of claim 8, wherein the pulse-forming circuit comprises a Blumlein circuit.

11. The pulsed-power accelerator of claim 8, wherein the pulse-forming circuit comprises one or more switches.

12. The pulsed-power accelerator of claim 11, wherein the one or more switches comprises an electrically- or laser-triggered gas switch.

13. The pulsed-power accelerator of claim 11, wherein the one or more switches comprises a self-break switch.

14. The pulsed-power accelerator of claim 11, wherein the one or more switches comprises a triggered liquid-dielectric or solid-dielectric switch.

15. The pulsed-power accelerator of claim 11, wherein the one or more switches comprises a semiconductor switch.

16. The pulsed-power accelerator of claim 15, wherein the semiconductor switch comprises a photoconductive switch.

17. The pulsed-power accelerator of claim 1, wherein the variable impedance profile comprises an approximately exponential impedance profile.

18. The pulsed-power accelerator of claim 1, further comprising a vacuum convolute in the vacuum section that adds the radially converging power pulses of two or more triplate vacuum-transmission lines and delivers the combined current to the electrical load.

19. The pulsed-power accelerator of claim 18, wherein the vacuum convolute comprises a post-hole convolute.

20. The pulsed-power accelerator of claim 1, wherein the electrical load comprises a z-pinch.

21. The pulsed-power accelerator of claim 1, wherein the accelerator is a two-sided accelerator comprising one or more pulse-generator levels on a bottom side and one or more pulse-generator levels on a top side.

* * * * *